United States Patent [19]
Collins

[11] 3,724,629
[45] Apr. 3, 1973

[54] ROLLER ASSEMBLY

[76] Inventor: William Collins, 1490 Dillingham Boulevard, Apt. No. 215, Honolulu, Hawaii 96817

[22] Filed: Nov. 16, 1971

[21] Appl. No.: 199,100

[52] U.S. Cl.................193/35 R, 118/116, 226/176, 226/199, 198/167
[51] Int. Cl...........................................B65g 13/11
[58] Field of Search....................34/151, 162, 155; 118/114–117, 227, 228; 193/35 R, 35 J, 37; 164/282, 283; 198/127 R, 167; 226/194, 199, 176; 271/51

[56] References Cited

UNITED STATES PATENTS

| | | |
|---|---|---|
| 3,308,555 | 3/1967 | Kruger....................................34/155 |
| 3,340,618 | 9/1967 | Bentzman...............................34/162 |
| 2,827,153 | 3/1958 | Olk et al. ...........................198/127 R |
| 3,345,928 | 10/1967 | Krehbiel..........................34/162 UX |
| 1,406,228 | 2/1922 | Riedel.................................193/35 R |
| 2,391,272 | 12/1945 | Rose....................................193/35 R |
| 3,528,488 | 9/1970 | Bode...............................193/35 R X |
| 3,495,651 | 2/1970 | Rokop et al. .....................164/283 X |

*Primary Examiner*—Richard E. Aegerter
*Assistant Examiner*—W. Scott Carson
*Attorney*—Harry A. Herbert, Jr. et al.

[57] ABSTRACT

A roller assembly having a pair of frames pivotally joined together and a plurality of rollers mounted therein. A pair of roller supports are secured to each frame in such a manner as to permit individual rollers to be removed from the assembly without interrupting the operation of any remaining rollers.

6 Claims, 5 Drawing Figures

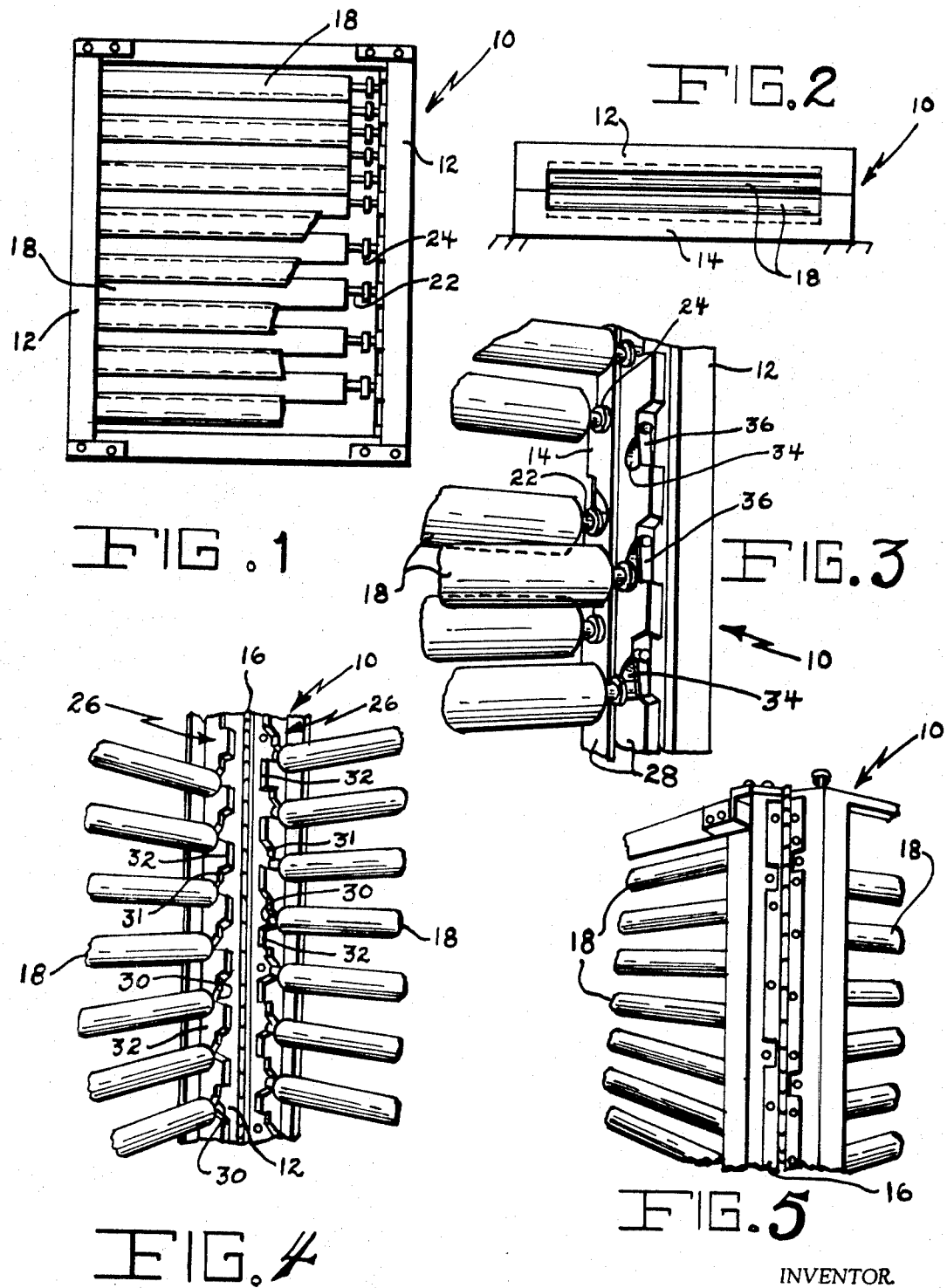

ROLLER ASSEMBLY

BACKGROUND OF THE INVENTION

This invention relates generally to roller assemblies, and more particularly to a roller conveyor in which the individual rollers may be easily removed during machine operation.

Roller conveyors have been found to be a swift and economical manner of transporting articles or materials. In particular, roller conveyors have been extremely essential in today's copying industries. For example, the roller is a common component of a copying machine in feeding copy paper through the drier. However, a major problem heretofore encountered is the problem of jams occurring during machine operation. These jams usually occur due to misalignment, imperfections in the paper and mechanical failure of the equipment. Such a jam may result in a great loss of time and money and thereby mean the difference between a commercially successful machine and one that is unacceptable.

It is therefore of primary importance in the design of machines which transport material by means of rollers that the roller assembly is not the cause of the formation of such jams, and equally important should a jam occur, the assembly must incorporate readily accessible construction features that enable even an unskilled operator to easily get to the source of the trouble and to quickly take the necessary remedial action.

Roller conveyors are generally constructed with a frame which includes a pair of spaced parallel side rails, usually of channel section, between which the rollers are supported. In the usual case, the roller includes an axle which projects beyond opposite ends of the roller and is rotatably mounted within the roller by suitable bearings. The projected ends of the axle are conventionally supported within openings or brackets located on the respective side rails. These conveyors may be either power driven as by a driven belt engaging the under surface of the rollers, or may be in the form of gravity conveyors in which the rollers merely define a substantially frictionless surface upon which articles are conveyed by gravity.

Heretofore, these conveyors were designed with the principal purpose of conveying material therethrough with little regard given to the construction which enabled quick disassembly of the conveyor in case of jamming.

SUMMARY OF THE INVENTION

The roller assembly of the instant invention overcomes the problems set forth hereinabove.

In the instant invention, the roller assembly is made up of a plurality of rollers aligned parallel to each other through which a treated material (such as paper or cloth) passes. The function of the roller combination of this invention is to absorb and/or spread the excess liquid or fluid remaining on the treated material so that it may dry rapidly in final stages of machine operation and to aid in the transporting of the treated material from one area of a machine to the other.

The roller assembly of this invention is further made up of a hinged arrangement which supports these rollers and a novel design which enables the rollers to be easily removed without interruption of the transporting operation of the machine. Therefore, any malfunction during operation can be easily corrected and all checks be made. For example, when foreign matter or mechanical defects are noted, the technician can remove a roller, affect the necessary repair without impairing the continued operation of the machine, thereby preventing waste of the materials and man hours.

It is therefore an object of the invention to provide a roller assembly which requires less maintenance in operation than the apparatus presently in use.

It is a further object of this invention to provide a roller assembly which allows individual rollers to be removed from the assembly while the machine is still in operation.

It is another object of this invention to provide a roller assembly which is economical to produce, highly reliable in operation and which utilizes conventional currently available components that lend themselves to standard mass producing manufacturing techniques.

For a better understanding of the present invention together with other and further objects thereof, reference is made to the following description taken in connection with the accompanying drawing and its scope will be pointed out in the appended claims.

DESCRIPTION OF THE DRAWING

FIG. 1 is a plan view of the roller assembly of this invention, shown partly in cross-section;

FIG. 2 is an end view of the roller assembly of this invention;

FIG. 3 is an enlarged pictorial view of a portion of the rollers and clamps of the roller assembly of this invention;

FIG. 4 is a front pictorial view of the roller assembly of this invention showing in detail the inner structure of the hinge; and FIG. 5 is a rear pictorial view of the roller assembly of this invention showing in detail the outer structure of the hinge.

DETAILED DESCRIPTION OF THE PREFERRED EMBODIMENT

Reference is now made to FIGS. 1 and 2 of the drawing which best show the roller assembly 10 of this invention. The instant roller assembly 10 may be used alone as a means of transporting articles or material from one location to another, but finds its greatest utility in conjunction with other equipment, such as a copy machine (not shown), by feeding paper therethrough. Furthermore, roller assembly 10 may be in the form of a gravity conveyor as shown in the drawing or be power driven (not shown) by any conventional power source without altering the inventive concept set forth hereinbelow.

The roller assembly 10 is made up of a pair of frames 12 and 14 which removably secure therein a plurality of rollers 18. Frames 12 and 14 are pivotally mounted together at one end by any suitable securing means, such as hinge 16 (shown in FIGS. 4 and 5). The frames 12 and 14 are shown in a rectangular configuration but may take on any form necessitated by its use. Rollers 18 are rotatably mounted on axles 22 which have their respective ends mounted in any suitable bearing member 24. The rollers 18 may be made of any suitable material which is capable of absorbing and/or spreading excess liquid during the transportation of material therethrough.

Forming an essential part of the roller assembly 10 of this invention are the roller supports 26 and 28 (best shown in FIGS. 3 and 4) and explained in detail hereinbelow. Roller supports 26 and 28 allow for the easy removal of rollers 18 from the assembly 10 even during the transportation operation. Heretofore, a repair technician would have to stop the machine associated with roller assembly 10 when the assembly is suspected to be malfunctioning. Materials that have been partially processed and chemicals used in the processing as well as many man hours would be lost. The design of roller supports 26 and 28 circumvent this problem allowing the rapid removal of any roller 18 at any time during operation.

A pair of roller supports 26 are secured by any suitable means to the inner rear portion of frames 12 and 14, respectively, adjacent hinge 16. Supports 26 are formed of either a single piece of material or a plurality segments which allow for the formation of recessed portions 30 facing the interior of assembly 10. Bearing members 24 which support one end of each of the rollers 18, respectively, are located within recesses 30. Adjacent each recessed portion 30 is a stepped segment 31 and an upstanding element 32 shaped to fit within an opposed stepped segment 31. Each such roller support 26 is mounted on a respective frame 12 and 14 in a position offset with respect to the other so that when frames 12 and 14 are in the closed or operative position as shown in FIG. 2 the outstanding elements 32 fit within an opposite stepped segment 31 thereby securely holding bearing members 24 in recess 30.

Another pair of roller supports 28 are mounted on the inner front portion of supports 12 and 14, respectively, as shown in FIG. 3. These supports 28 have a plurality of recessed portions 34 therein aligned with recessed portions 30 of supports 26. Bearing members 24 of the other end of rollers 18 are located within the recessed portions 34 of roller supports 28. Furthermore, recessed portions 34 face the exterior of frames 12 and 14 so as to allow for the easy withdrawal of rollers 18 when desired. A latch 36 is pivotally mounted adjacent each recessed portion 34 for removably securing the bearing members 24 of rollers 18 therein.

As shown in FIGS. 3 and 4, rollers 18 are free to rotate on axles 22 within frames 12 and 14, secured at one end by the interlocking arrangement of roller supports 26 and at the other end by latch 36 of roller supports 28.

During operation of a machine utilized with the roller assembly of this invention, it is possible to remove any roller 18 by merely unlocking the desired latch 36 and pulling the appropriate roller 18 from recessed portions 30 and 34 in supports 26 and 28, respectively. The roller 18 may be reinstalled by the reversed procedure of inserting the bearing member 24 at one end of roller 18 within recess 30 of support 26, thereafter inserting the bearing member 24 at the other end of roller 18 in recess 34 of support 28 and relocking latch 30. This procedure eliminates the opening of frames 12 and 14 of assembly 10 of the instant invention and/or stopping the operation of the machine associated therewith.

For quick removal of rollers 18 after completion of machine operation, for example, all that is required is the separation of frames 12 and 14. This operation disengages outstanding elements 32 from stepped segments 31 in supports 26, thereby allowing the rollers 18 to be withdrawn from recessed portions 30 without the unlocking of individual latches 36.

Although the invention has been described with reference to a particular embodiment, it will be understood to those skilled in the art that this invention is also capable of a variety of alternate embodiments within the spirit and scope of the appended claims.

I claim:

1. A roller assembly comprising a pair of frames, a hinge pivotally mounting said frames together, a plurality of rollers rotatably mounted within each of said frames, a first pair of roller supports secured to one end of each of said frames, each of said first pair of roller supports having a plurality of recessed portions therein, a stepped segment and an upstanding element adjacent thereto, one end of each of said rollers being supported in each of said recessed portions, whereby when said roller assembly is in the closed position each of said upstanding elements on one of said first pair of roller supports fits within an opposed stepped segment on the other of said first pair of roller supports thereby holding said rollers in place, and a second pair of roller supports secured to the other end of each of said frames for removably securing the other end of said rollers within said frames whereby any roller may be removed from said roller assembly without interrupting the operation of the other rollers.

2. A roller assembly as defined in claim 1 wherein each of said first pair of roller supports are identical in design and are mounted on said respective frames in an offset position with respect to one another thereby supporting one end of each of said rollers therebetween.

3. A roller assembly as defined in claim 2 wherein said second pair of roller supports have a plurality of recessed portions therein for supporting the other end of said rollers and a latch means located adjacent each of said recessed portions for removably locking said rollers in place.

4. A roller assembly as defined in claim 3 wherein said first pair of roller supports have their recessed portions facing the interior of said frames.

5. A roller assembly as defined in claim 4 wherein said second pair of roller supports have their recessed portions facing the exterior of said frames.

6. A roller assembly as defined in claim 5 wherein each of said rollers are rotatably mounted on an axle, said axle having a bearing member at each end thereof, said bearing members fitting into said recessed portions of said first and second roller supports.

* * * * *